United States Patent
Humphreys et al.

(12) 
(10) Patent No.: US 11,775,961 B2
(45) Date of Patent: Oct. 3, 2023

(54) ORDER AND PURCHASE INTEGRATION

(71) Applicant: MASTERCARD INTERNATIONAL INCORPORATED, Purchase, NY (US)

(72) Inventors: Derek Humphreys, Dublin (IE); Alonso Araujo, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 307 days.

(21) Appl. No.: 16/208,005

(22) Filed: Dec. 3, 2018

(65) Prior Publication Data

US 2019/0188692 A1 Jun. 20, 2019

(30) Foreign Application Priority Data

Dec. 20, 2017 (EP) .................................. 17208857

(51) Int. Cl.
*G06Q 20/38* (2012.01)
*G06Q 20/36* (2012.01)
(Continued)

(52) U.S. Cl.
CPC ..... *G06Q 20/3672* (2013.01); *G06Q 20/0855* (2013.01); *G06Q 20/12* (2013.01);
(Continued)

(58) Field of Classification Search
CPC .............................................. G06Q 20/3672
(Continued)

(56) References Cited

U.S. PATENT DOCUMENTS

| 5,557,518 A * | 9/1996 | Rosen ................. G06Q 20/204 705/76 |
| 8,346,659 B1 * | 1/2013 | Mohsenzadeh ........ G06Q 20/00 705/37 |

(Continued)

FOREIGN PATENT DOCUMENTS

| EP | 3032478 A1 | 6/2016 |
| WO | WO2016/032071 A1 | 3/2016 |

OTHER PUBLICATIONS

Schechner-Resom, M., "Communication Pursuant to Article 94(3) EPC", Application No. EP 17 208 857.7, dated Mar. 2, 2021, 7 pages.

(Continued)

*Primary Examiner* — Chinedu C Agwumezie
(74) *Attorney, Agent, or Firm* — Barta, Jones & Foley, PLLC

(57) ABSTRACT

Ordering and purchasing processes are integrated into a messaging session between a user device and a merchant server. Within the messaging session, a dialogue is established between the user device and the merchant server. The merchant server obtains user information in order to communicate with a service provider to establish a transaction with an account associated with the user device. The merchant server obtains order information from the user device by interpretation of the dialogue, and creates an order. The user requests payment, and receives a payment link from the merchant server in order to make a transaction. The user provides payment information including identification of the account associated with the user device for the transaction to the merchant server. Once these actions have taken place, the merchant server uses the order information and the payment information to enable the transaction to be performed using the account.

20 Claims, 17 Drawing Sheets

(51) Int. Cl.
*G06Q 20/08* (2012.01)
*G06Q 30/0601* (2023.01)
*H04L 51/02* (2022.01)
*G06Q 20/12* (2012.01)
*H04L 51/52* (2022.01)

(52) U.S. Cl.
CPC ..... *G06Q 30/0601* (2013.01); *G06Q 30/0609* (2013.01); *G06Q 30/0641* (2013.01); *H04L 51/02* (2013.01); *H04L 51/52* (2022.05)

(58) Field of Classification Search
USPC ......................................................... 705/66
See application file for complete search history.

(56) References Cited

U.S. PATENT DOCUMENTS

| | | | |
|---|---|---|---|
| 2016/0307196 A1* | 10/2016 | Achhra | G06Q 20/3821 |
| 2017/0256001 A1 | 9/2017 | Isaacson et al. | |
| 2018/0183737 A1* | 6/2018 | Subbarayan | H04L 51/216 |
| 2018/0366114 A1* | 12/2018 | Anbazhagan | G06F 3/167 |
| 2019/0114608 A1* | 4/2019 | Nelms | G06Q 20/3674 |

OTHER PUBLICATIONS

Masterpass; https://developer.mastercard.com/product/masterpass; web accessed Oct. 2, 2018; 4 pgs.
Payments (beta); https://developers.facebook.com/docs/messenger-platform/payments; web accessed Oct. 2, 2018; 5 pgs.
Facebook Messenger now allows payments in its 30,000 chat bots; https://techcrunch.com/2016/09/12/messenger-bot-payments/; Sep. 12, 2016; 14 pgs.

\* cited by examiner

//ORDER AND PURCHASE INTEGRATION

CROSS-REFERENCE TO RELATED APPLICATION

This application claims the benefit of and priority to European Patent Application No. 17208857.7, filed Dec. 20, 2017. The entire disclosure of the above application is incorporated herein by reference.

FIELD

The present disclosure relates to order and purchase integration. In embodiments, it relates to integration of user and merchant interaction with payment in existing messaging platforms.

BACKGROUND

This section provides background information related to the present disclosure which is not necessarily prior art.

Ordering goods or services from a merchant may take place by telephone but will generally be conducted over an online interface, such as the merchant's web storefront. While this will generally provide good functionality for the merchant, it may not be the most convenient approach for a user who needs to find and navigate the merchant website, and then work through various screens to make an order and to effect purchase. For the merchant, while taking new orders may be convenient, there will have been substantial cost and effort invested in producing an online storefront.

A user's natural interface with a merchant may now be through a social media platform, such as Facebook®, with the natural line of communication being through an associated messaging application, such as Facebook® Messenger. It would be desirable to provide a similar quality of user experience for the user in the process of ordering and paying for goods and services so that these processes felt as natural to the user as possible. It would be desirable to do this in such a way that the functionality needed by the merchant was not compromised.

SUMMARY

This section provides a general summary of the disclosure, and is not a comprehensive disclosure of its full scope or all of its features. Aspects and embodiments of the disclosure are set out in the accompanying claims.

In a first aspect, the disclosure provides a method of integrating ordering and purchasing into a messaging session between two computing devices, a user device and a merchant server, the method comprising within the messaging session: establishing a dialogue between the user device and the merchant server; the merchant server obtaining user information to enable the merchant server to communicate with a service provider to establish a transaction with an account associated with the user device; the merchant server obtaining order information from the user device by interpretation of the dialogue and creating an order from the order information; the user requesting payment and receiving a payment link from the merchant server within the messaging session in order to make a transaction, the user providing payment information including identification of an account associated with the user device for the transaction to the merchant server, directly or indirectly; whereupon the merchant server uses the order information and the payment information to enable the transaction to be performed using the account associated with the user device.

This technical steps involved in this approach enable both an effective ordering interaction between the user and the merchant and an effective and secure payment process.

In embodiments, the user information comprises an access token originating from the user device which has already been obtained by the merchant server in a previous dialogue.

In some cases, the user information may comprise an access token originating from the user device obtained during the dialogue. The user device may provide a session token to the merchant server, with the merchant server using the session token to obtain the access token from the service provider.

When an access token is used, this may be a long term access token providing authorization for use in multiple transactions, such that the long term access token allows bypassing of an authorization step at the user device. Alternatively, the access token may be a short term access token requiring new authorization for each transaction.

The messaging session described above may be a Facebook® Messenger session. In such a case, a webview may be opened in the session to allow user payment confirmation. The payment link may then be a URL within the webview.

In a second aspect, the disclosure provides a computing device adapted to act as a user device in the method as described above, the computing device comprising a processor and a memory adapted to perform a plurality of applications, the plurality of applications comprising a messaging client and a payment application. The payment application may be, or comprise, a digital wallet, such as a MasterPass® wallet. The computing device may be a mobile telephone handset or a tablet computer.

In a third aspect, the disclosure provides a computing device adapted to act as a merchant server in the method as described above, the merchant server comprising a processor and a memory adapted to perform a plurality of applications, the plurality of applications comprising a messaging client, an order processing system and an order processing interface. The order processing interface may then comprise a chatbot.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the disclosure will now be described, by way of example, with reference to the accompanying Figures, of which:

Corresponding reference numerals indicate corresponding parts throughout the several views of the drawings.

DETAILED DESCRIPTION

Specific embodiments of the present disclosure will be described below with reference to the Figures. The description and specific examples included herein are intended for purposes of illustration only and are not intended to limit the scope of the present disclosure.

Figure 1:
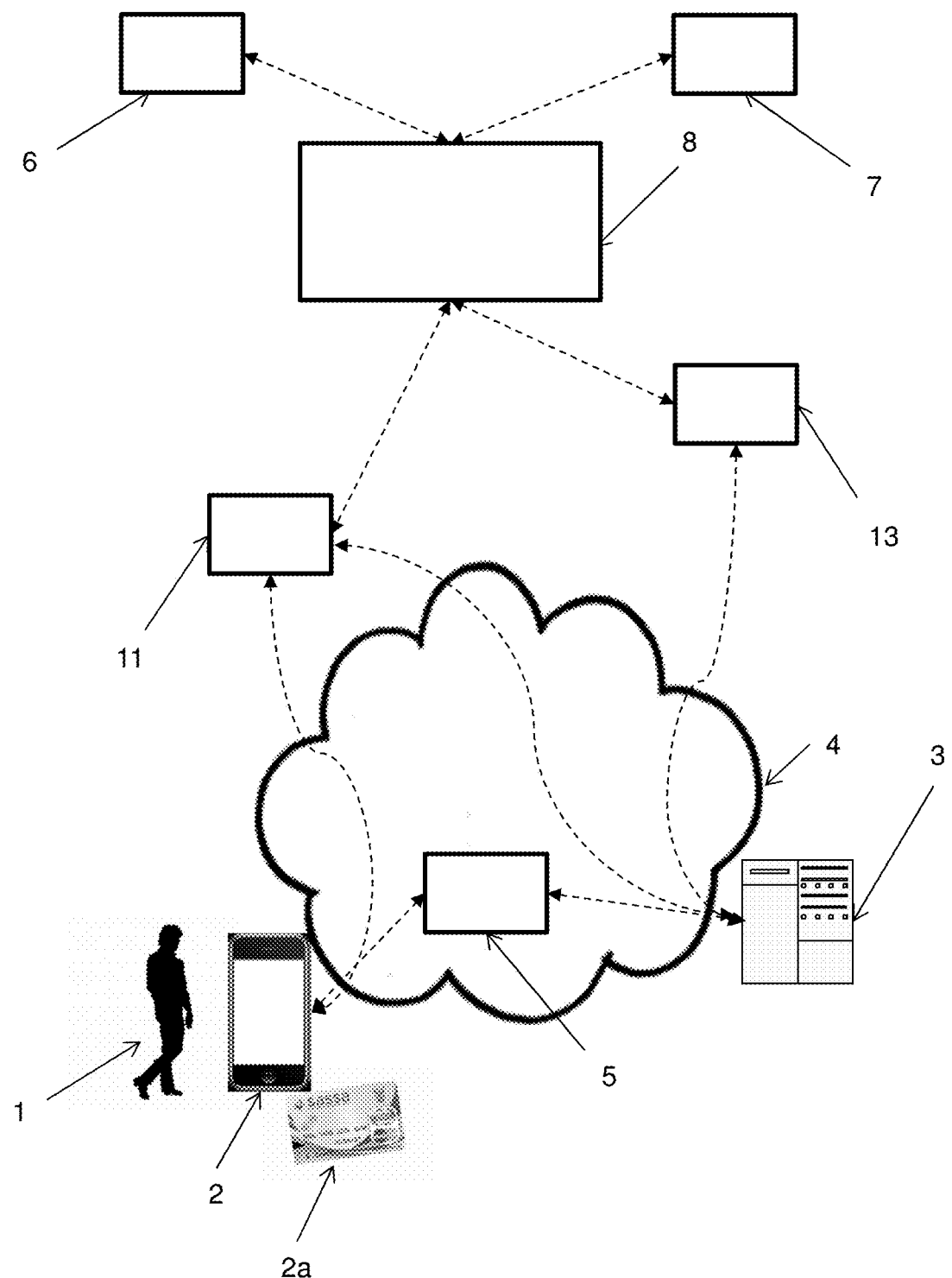
FIG. 1 shows the elements of a system adapted to implement embodiments of the disclosure.

The elements of a system adapted to implement embodiments of the disclosure are shown in FIG. 1. A user 1 equipped with an appropriate computing device, in this case a mobile phone 2 (referred to below as mobile phone 2 or user device 2), but it other cases this may be another mobile computing device or even a desktop PC, is able to communicate with a merchant server 3 over a computing network 4 (such as the public Internet) using a messaging system mediated by a messaging server 5. The mobile phone 2 is programmed to act as a payment device, for example, by acting as a proxy for a transaction card 2a or by hosting a virtual transaction card. This transaction card is associated with a user account. Both the user 1 and the merchant server 3 have access to a transaction system 8, in this case through a user transaction system gateway 11 and a merchant transaction system gateway 13. The transaction system 8 connects to an issuing bank 6 that holds the user account and an acquiring bank 7 that holds a merchant account. The transaction system enables the user 1 to be authenticated by the issuing bank 6, and enables a transaction between the user 1 and the merchant to be authorized and then performed by using funds from the user account at the issuing bank 6 and paying them into a merchant account held by the acquiring bank 7.

A suitable transaction system 8 may be one that implements EMV protocols (specifications are generally available from EMVCo at https://www.emvco.com/specifications.aspx). Various platforms exist to support digital wallets and their interaction with EMV based transaction systems, such as MasterPass®, and are provided by the present applicant (developer resources to produce MasterPass® implementations may be found at https://developer.mastercard.com/product/masterpass).

Figure 2A:
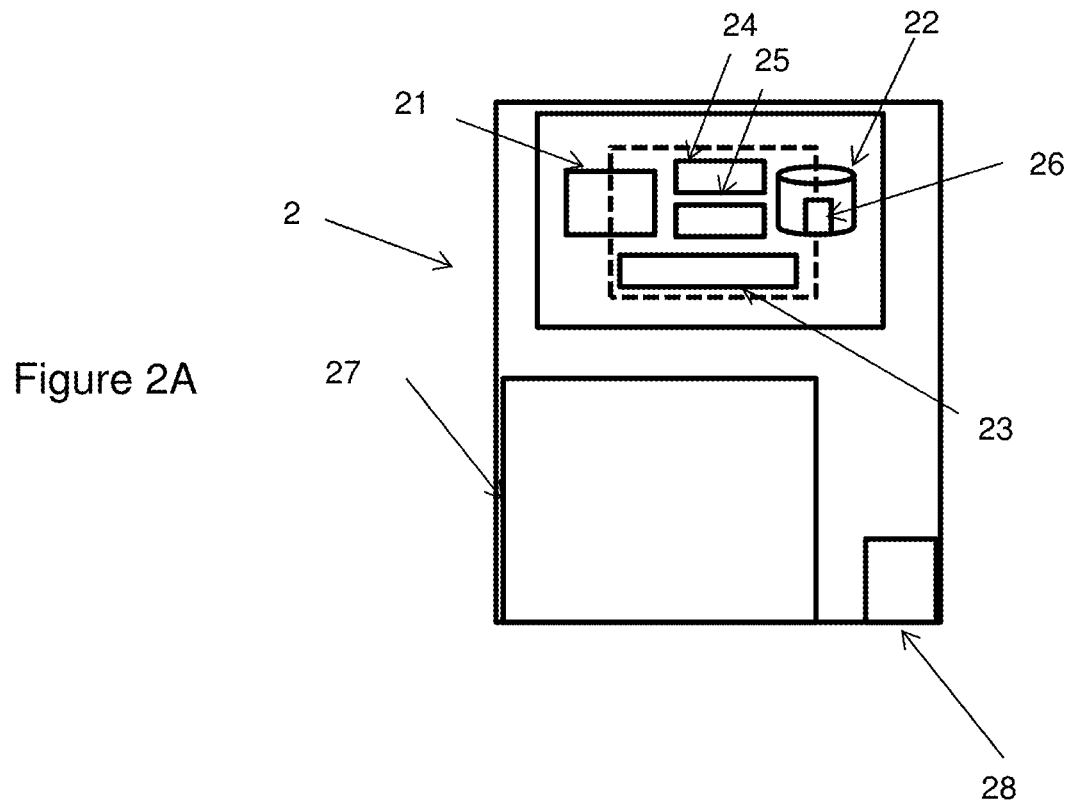
FIGS. 2A and 2B show the relevant functionality of a user mobile phone and of a server suitable for use for embodiments of the disclosure.

FIG. 2A shows the user mobile phone 2 in functional terms. The mobile phone 2 has one or more processors 21 and memories 22, between them defining an application space in which a plurality of applications can run under control of an operating system 23. These here include a messaging application 24 and a banking application 25. The memories 22 are one or more physically or logically protected memory areas 26 allows user credentials and cryptographic material to be held securely. The mobile phone 2 has a display 27 providing a touch screen user interface and has networking capability 28 (typically comprising not only capability to join a cellular telephony network but also short range wireless networking by WiFi or another 802.11 networking technology).

While embodiments of the disclosure may apply to a range of messaging systems and social media applications, the embodiment described in detail below uses Facebook® Messenger. However, the functionality of Facebook® Messenger, while suitable for construction of an effective embodiment, is not critical to the operating principles of the disclosure.

Similarly, a variety of banking applications may be used in embodiments of the disclosure, but the embodiment described in detail below uses MasterPass®. MasterPass® is an open platform providing digital wallet functionality at a user device and a digital payment service through a transaction network (in this case, the MasterCard network) reached by the user 1 through a user transaction system gateway. As noted above, MasterPass® is described in more detail at https://developer.mastercard.com/product/masterpass, from which the skilled person may obtain information necessary to provide a MasterPass® implementation.

In the embodiment shown here, MasterPass® provides the user transaction system gateway 11. A connection is also shown between the MasterPass® gateway and the merchant server 3. This may be necessary where a tokenized approach to payment is used, in particular, in order to provide necessary details of the card or cardholder to the merchant transaction system gateway 13 so that the transaction can be processed, the merchant server 3 may need to obtain or release these details from a token provided by the mobile phone 2 (or other user device).

Figure 2B:
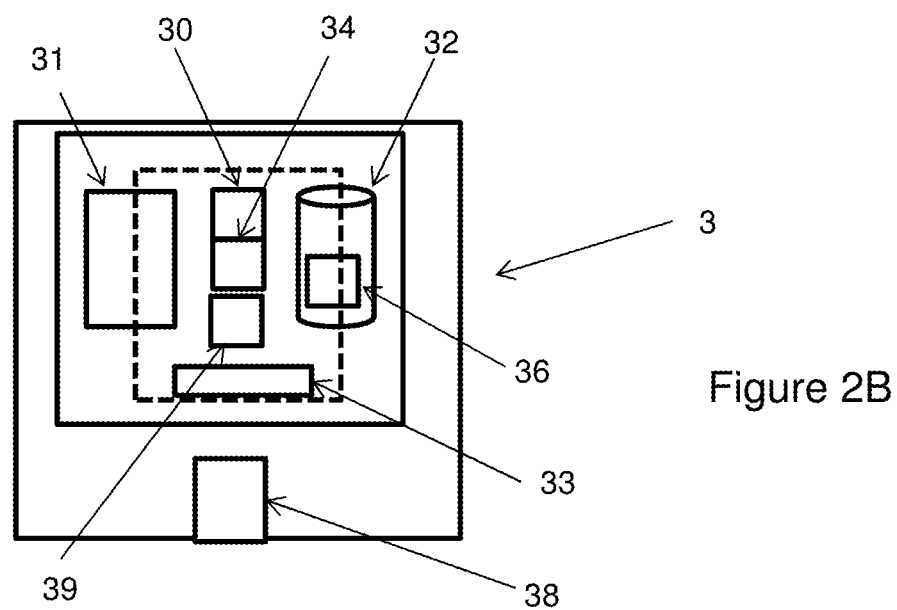

FIG. 2B shows the merchant server 3 in functional terms. The merchant server 3 also has one or more processors 31 and memories 32, with an operating system 33 defining an operating environment within which a plurality of applications and services will run. These applications will include a messaging application 34, but also a "chatbot" application 30 (a natural language processing application appropriately connected to the messaging application and other merchant server applications) and an order processing system 39. The chatbot application 30 is connected to the messaging application 34 and the order processing system 39 as discussed below. The merchant server 3 may again have protected memory areas 36 to allow secure cryptographic operations. The merchant server 3 also has networking capability 38 (typically comprising a connection to the public Internet through a telephone or fiber network, but also short range wireless networking by WiFi or another 802.11 networking technology).

Embodiments of the disclosure may use a variety of messaging applications and social media applications, but an effective embodiment may be provided using Facebook® Messenger, the messaging application associated with the Facebook® social media platform. Facebook® Messenger has specific capabilities that support the use of payment applications. One is Webview, which allows the creation of lightboxes within Facebook® Messenger associated with other applications. In implementing Webview, Facebook® Messenger provides support for payment capability within messenger (discussed at https://techcrunch.com/2016/09/12/messenger-bot-payments/), with more extensive discussion of the support provided by Facebook® at https://developers.facebook.com/docs/messenger-platform/complete-guide/payments. This approach has generally been used to provide an end of session payment capability, similar to that typically used on a conventional merchant website.

The chatbot application 30 provides an effective interface for the user 1 into the merchant's order processing system 39. As the skilled person will appreciate, such a chatbot application may be constructed to purpose based on standard tools, such as a natural language processor (such as those provided by wit.ai®, IBM® Watson and Houndify®) and a chatbot connector. What is needed beyond this is an appropriate integration with the order processing system 39 so that as a result of natural language conversations the user 1 will select one or more available options from the merchant's order processing system 39, in such a way that the interaction is natural for the user 1 and so that any information that the merchant wants to convey to the user 1 (such as currently available offers) is communicated during the user's interaction with the chatbot.

The merchant's order processing system 39 may be essentially unchanged. The chatbot simply provides an additional user interface to allow the user 1 to select valid options from the order processing system 39 and arrange payment. The chatbot order system may run in parallel with the merchant's existing web ordering system, an in-store system for use in handling telephone orders, or any other interface.

Figure 3:
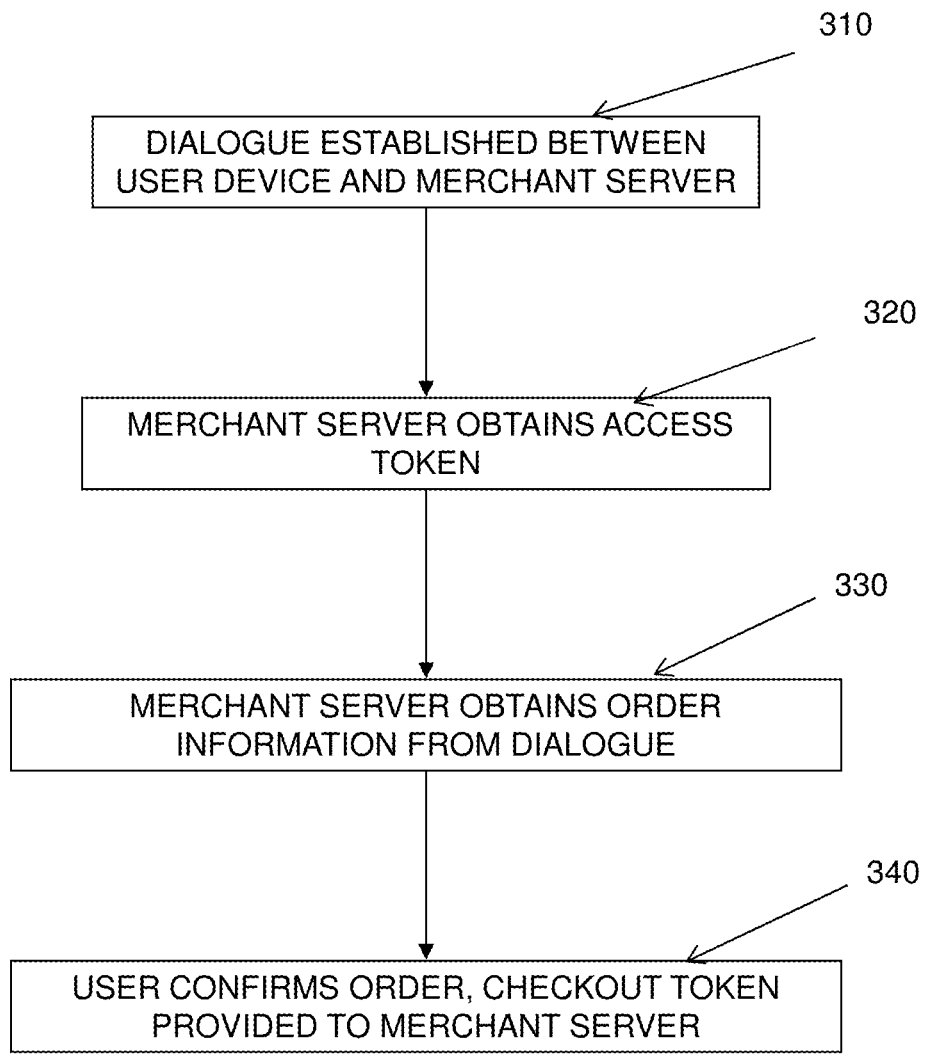
FIG. 3 is a flow diagram indicating a method according to the disclosure in general terms.

FIG. 3 is a flow diagram indicating a method of integrating ordering and purchase into a messaging session between a user device and a merchant server according to the disclosure in general terms.

A dialogue is established 310 between the user device 2 and the merchant server 3. The merchant server 3 obtains 320 an access token originating from the user device 2 to enable the merchant server 3 to communicate with a service provider to establish a transaction with an account associated with the user device 2. If there have been earlier dialogues between the merchant server 3 and the user device 2, the merchant server 3 may already have such an access token. If not, it will have to obtain one from the user device 2 at this point.

The merchant server 3 obtains 330 order information from the user device 2 by interpretation of the dialogue and creating an order from the order information. This may be by utilizing a chatbot at the merchant server 3, enabling a natural language interaction with the user 1. The user 1 confirms 340 the order and confirms payment by providing a checkout token to the merchant server 3. The merchant server 3 uses the access token and the checkout token to enable the transaction represented by the checkout token to be performed using the account associated with the user device 2.

An embodiment of the disclosure using Facebook® Messenger as the messaging application with a MasterPass® payment application will now be described with reference to the flow diagrams of FIGS. 4 to 7 and the associated user display screens of FIGS. 8 to 15.

Figure 4:
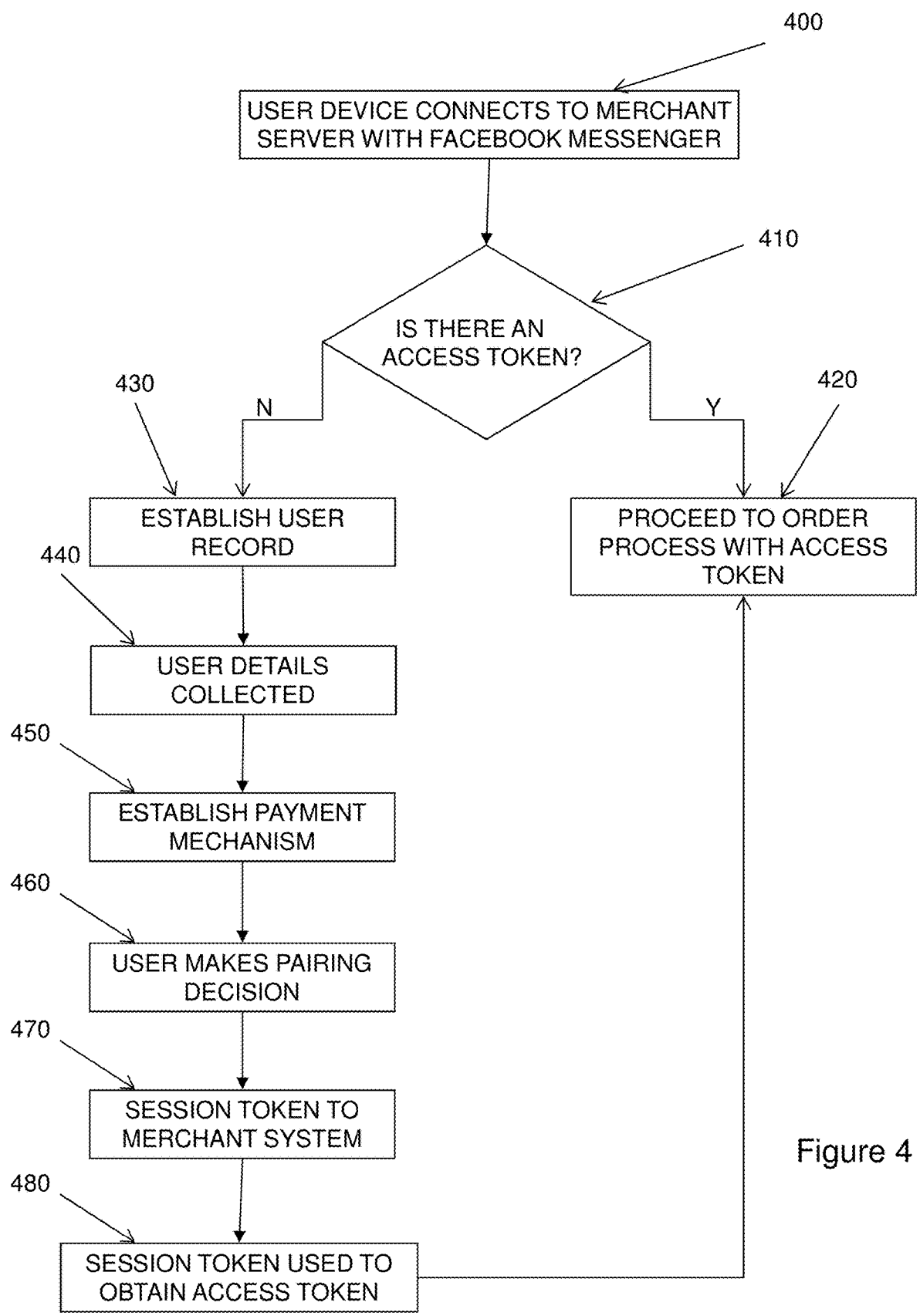
FIG. 4 is a flow diagram showing an initial interaction between a user device and merchant server including a new user protocol for an embodiment of the disclosure.

FIG. 4 shows initial interactions between the user device 2 and the merchant system providing the chatbot interface prior to the start of the order process. After the user device 2 connects 400 to the merchant system using Facebook® Messenger, the merchant system needs to determine 410 whether it has previously seen this user. If the answer is yes, then the merchant system will have already received a MasterPass® access token for that user (unless earlier interaction between the user 1 and the merchant system has been incomplete, terminating before an access token has been issued), and the merchant chatbot will be able to proceed 420 using the existing access token and associated user details, as discussed in FIG. 5 below.

If the answer is no, then there is a user establishment stage which allows the merchant system to obtain an access token. A record establishing step 430 for the user 1 takes place, and any details needed from the user 1 to establish a user record are collected 440 along with establishment 450 of the payment mechanism. To establish the payment mechanism, Facebook® Messenger opens a "Connect" webview to allow a user to authenticate themselves with whatever authentication mechanism is used for the MasterPass® wallet (typically a biometric identifier, such as a fingerprint). Essentially, the webview allows a call to an existing MasterPass® interface. This step establishes a short term session token which will subsequently be used to obtain an access token. The short term session token does not contain information that would allow a transaction to be established, as this information will subsequently be obtained securely by the merchant system using the access token.

On establishing the payment mechanism, the user 1 will be asked whether or not they wish to pair the MasterPass® wallet with the merchant system, as such pairing will allow an express checkout mechanism to be used, as will be described below. The user decision 460 to pair may be achieved simply by a yes/no menu option for the user 1, with this information being recorded and provided with the session token. The session token is then provided 470 to the merchant system, which establishes a secure connection to its MasterPass® gateway (merchant transaction system gateway 13 of FIG. 1) so that the session token can be used to obtain 480 an access token. This access token may be of two types. If pairing has taken place, then the access token is a long term access token which will allow an express checkout mechanism to be used. If the user 1 rejected pairing, then the access token is a short term access token, and it will be necessary to reconfirm the payment mechanism by user authentication to complete the transaction, as described further below.

Figure 5:
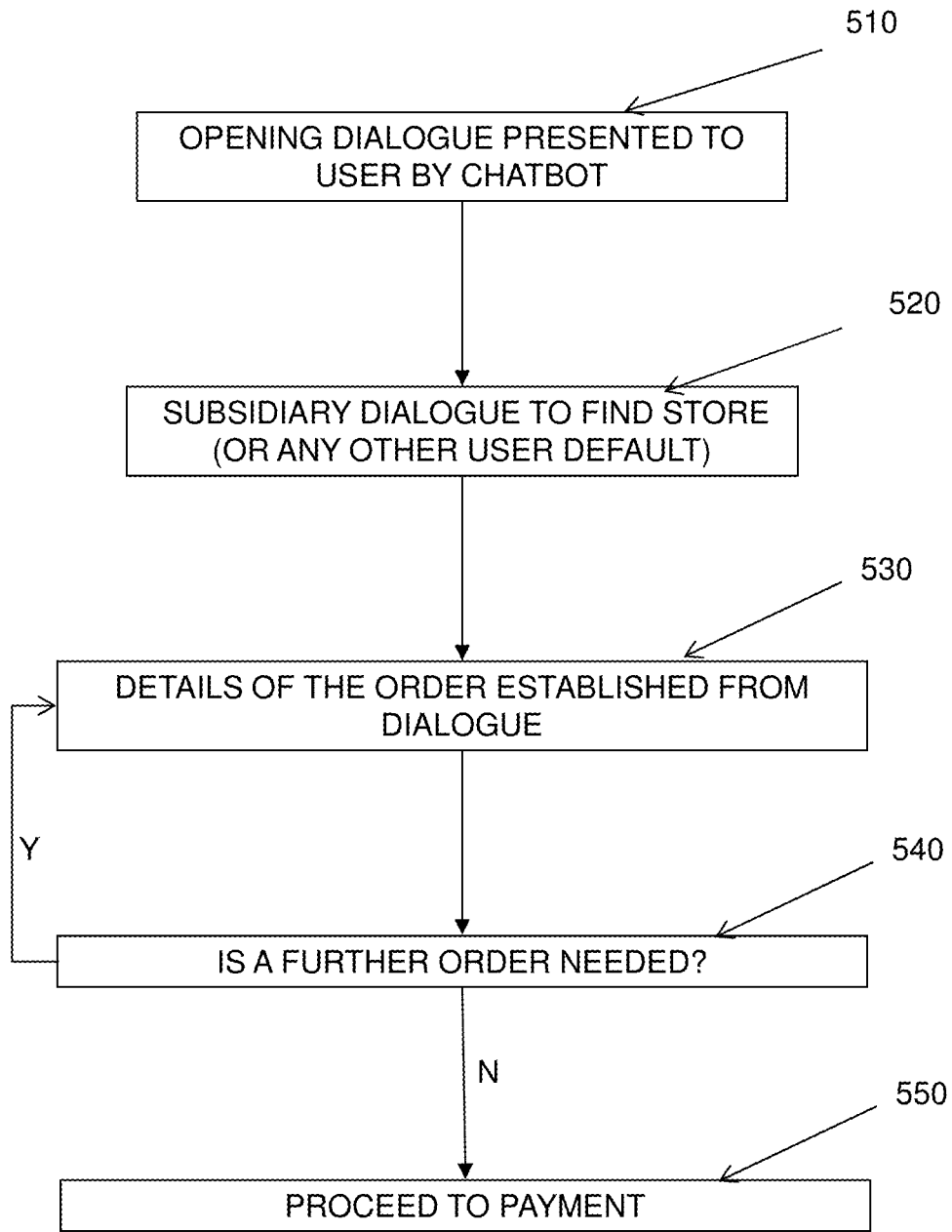
FIG. 5 is a flow diagram showing an order flow for a first order for an embodiment of the disclosure.
Figure 6:
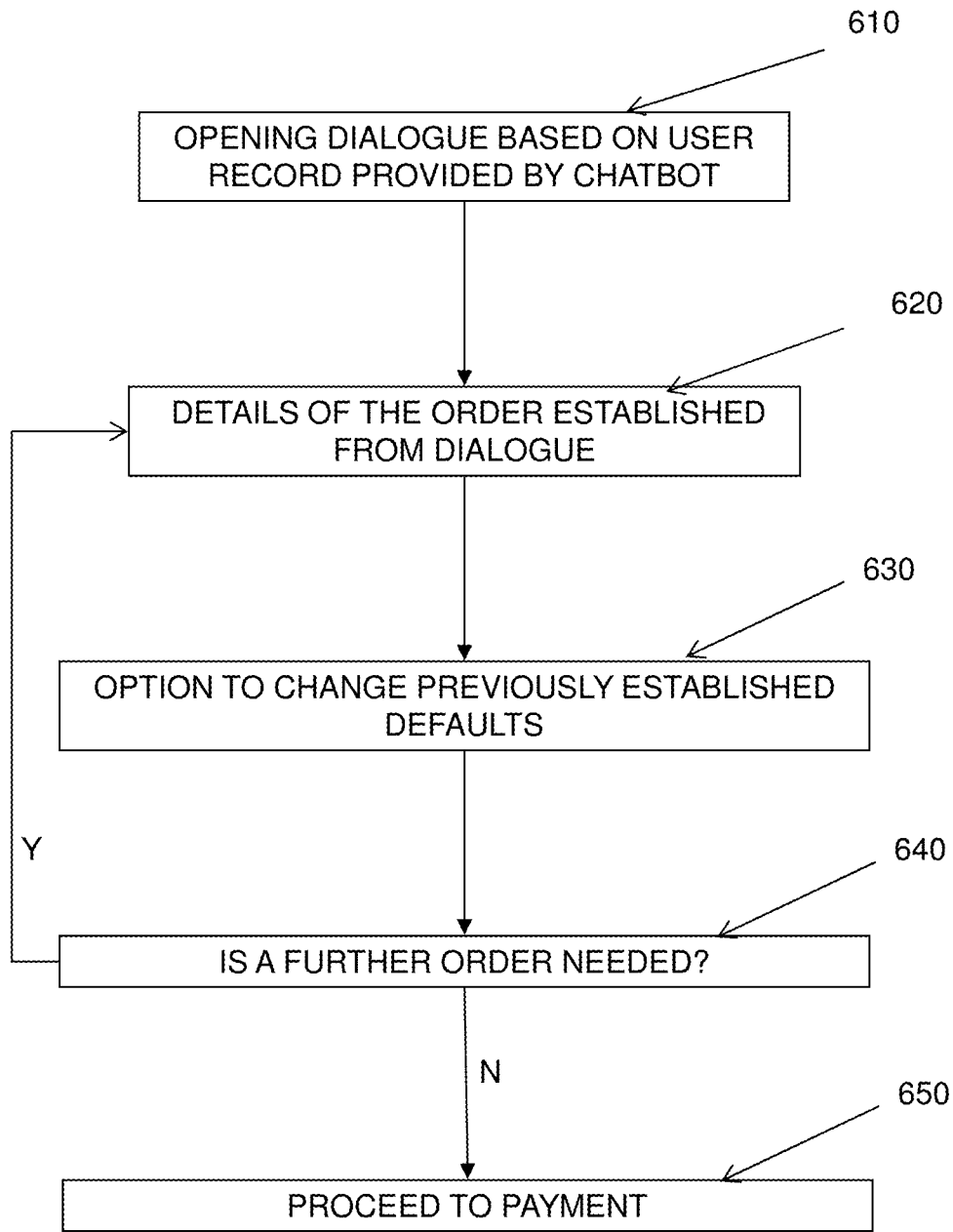
FIG. 6 is a flow diagram showing an order flow for a repeat order for an embodiment of the disclosure.

The next stage is the establishment of a user order, as illustrated in FIGS. 5 and 6, FIG. 5 showing an exemplary flow for an initial order with FIG. 6 showing an exemplary flow for a subsequent order. A specific example of this approach is described in detail with reference to illustrative user interface screens of FIGS. 8 to 10 and 12 to 15. At this point, a Facebook® Messenger messaging session has been established between the user device 2 and the merchant server 3, and (unless indicated otherwise below), communication between the two will be by means of this session.

Figure 7:
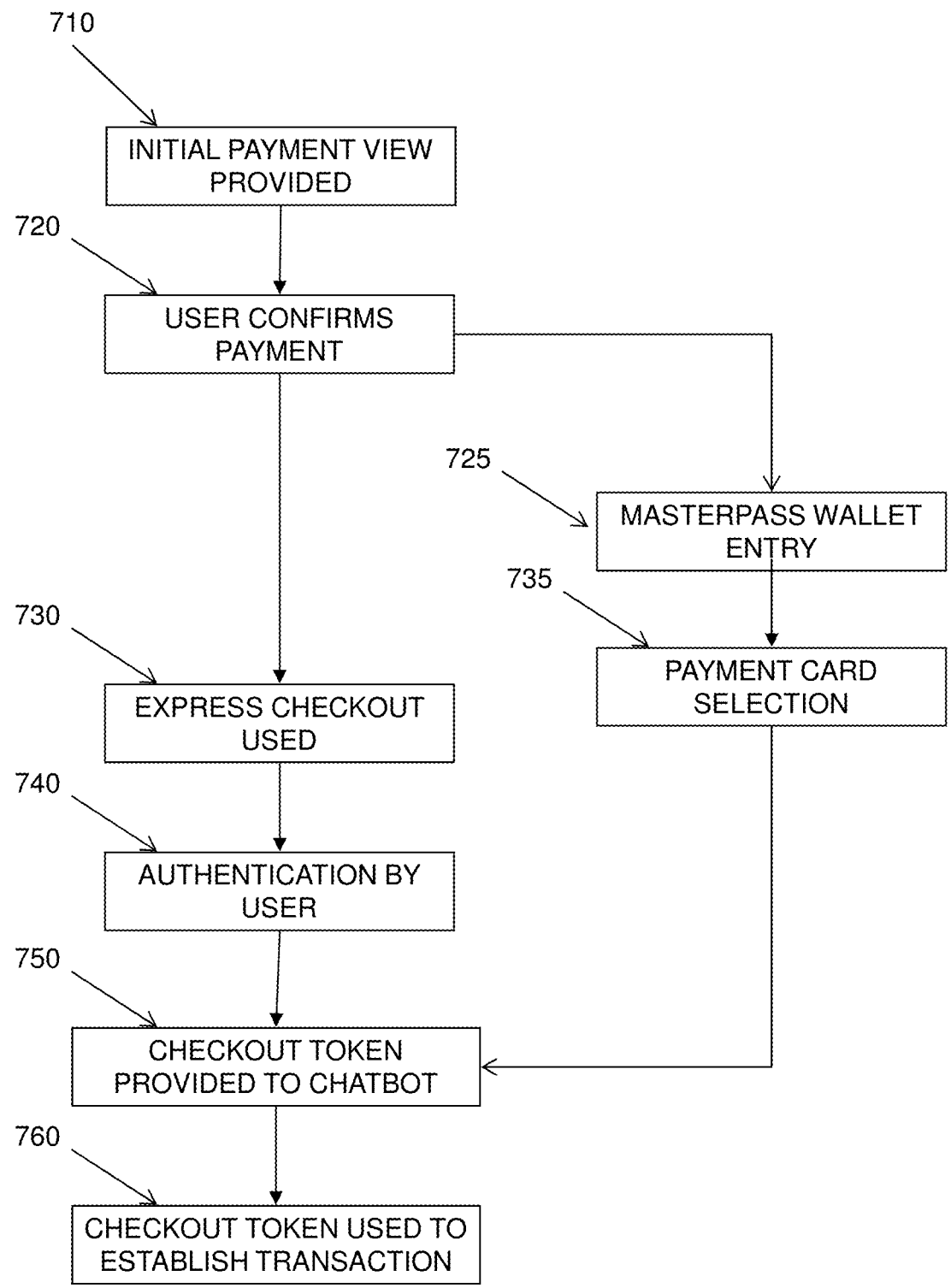
FIG. 7 is a flow diagram for a payment stage of the embodiment of FIGS. 4 to 6.
Figure 8A:
FIGS. 8A to 8E are screenshots of an exemplary user interface for an initial stage of an order process for an embodiment of the disclosure.
Figure 8B:
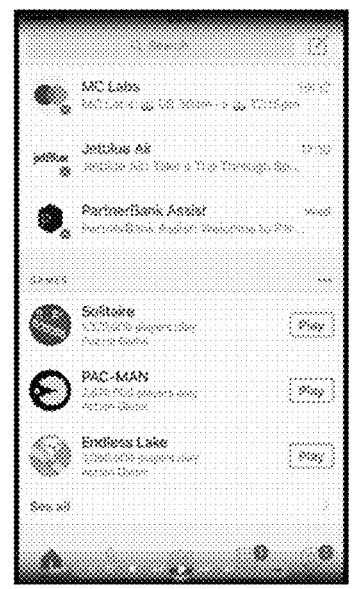
Figure 8C:
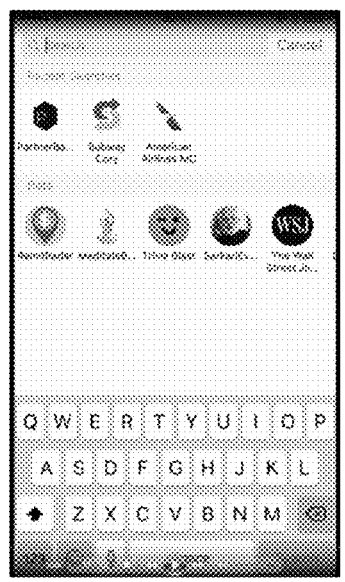
Figure 8D:
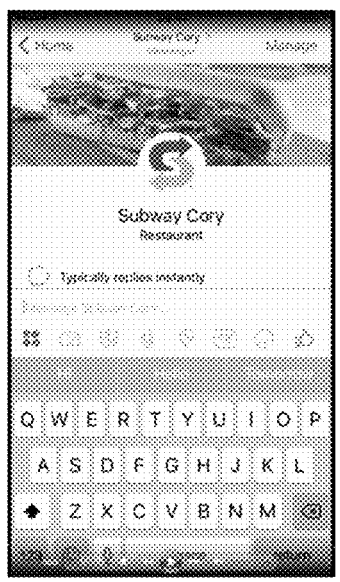
Figure 8E:
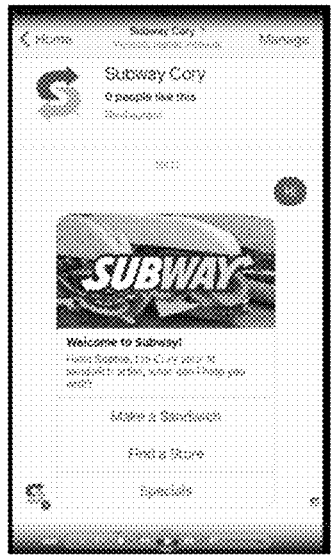
Figure 9A:
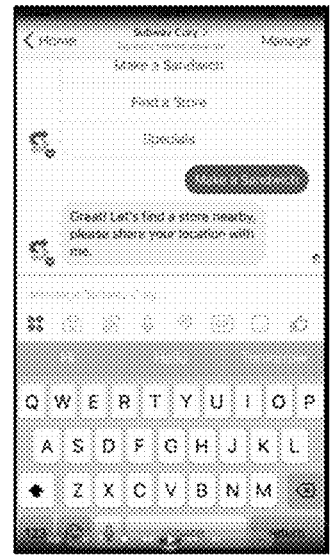
FIGS. 9A to 9D are screenshots of an exemplary user interface for a default establishing stage of an order process for an embodiment of the disclosure.
Figure 9B:
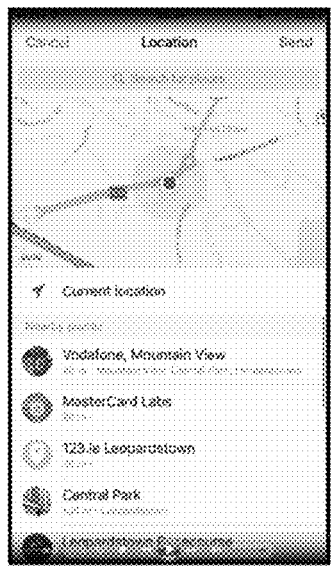
Figure 9C:
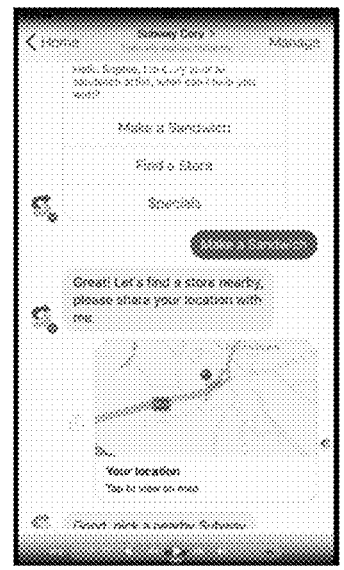
Figure 9D:
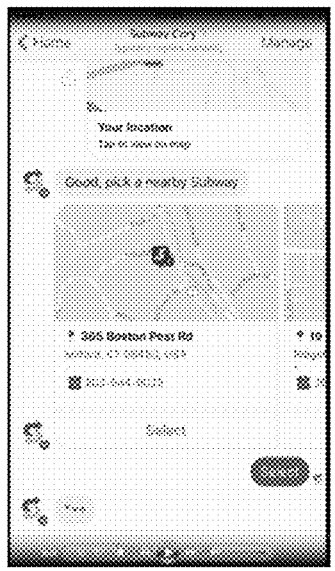
Figure 10A:
FIGS. 10A to 10F are screenshots of an exemplary user interface for a first order using an order process according to an embodiment of the disclosure.
Figure 10B:
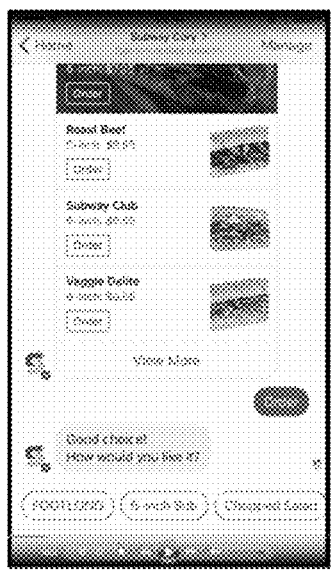
Figure 10C:
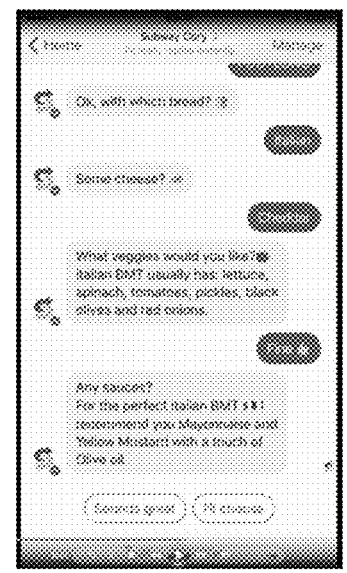
Figure 10D:
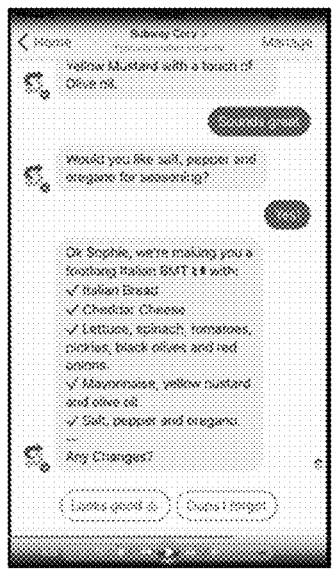
Figure 10E:
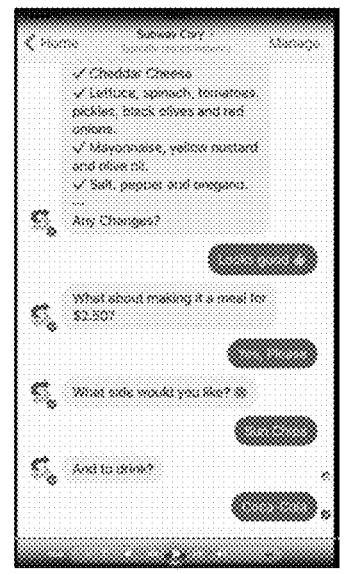
Figure 10F:
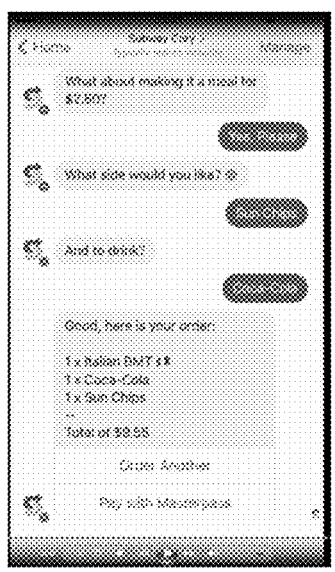

In an initial order, the chatbot first presents 510 an opening dialogue, which is shown here in FIG. 8E, and indicates an initial set of options: obtaining a product (in this case, making a sandwich to order), finding a store, and finding specials. These options are generic, as the chatbot has no user history at this point. When obtaining a product is selected, a subsidiary dialogue is established to find a store 520, which is illustrated in FIGS. 9B and 9C, using a third party mapping application that can be invoked from within the messaging session. In other contexts, other data needed for the order that may be used as a user default position may be collected at this stage. An option is picked by the user 1 (FIG. 9D), and this is now identified as a store used by the user 1, and will be remembered for future dialogues. Details of the first order are then established 530, and in this case, these details comprise a sandwich type (FIGS. 10A and 10B), extra fillings and dressings (FIGS. 10C and 10D), culminating in a completed sandwich order (shown in FIG. 10D). The dialogue comprises a mix of menu selections (as shown at the bottom of FIGS. 10B and 10C) and natural language questions, the combination providing a predominantly natural language interface designed to be natural for the user 1 and efficient for all parties. The user 1 is here given the option of extending the sandwich order into a meal order in the same way (as shown in FIGS. 10E and 10F), at which point the chatbot presents the user 1 with the option of making another sandwich order or making payment. If another sandwich order is required 540, the sandwich making steps indicated above will be followed in essentially the same way, with the user 1 proceeding to payment 550 when all sandwiches required have been ordered. The payment flow will be discussed further below with respect to FIG. 7, but after payment there may be an option for the user 1 to identify an ordered sandwich as a favorite (FIGS. 12A to 12C) before ending of the dialogue.

Figure 13A:
FIGS. 13A to 13F are screenshots of an exemplary user interface for a repeat order process for an embodiment of the disclosure.
Figure 13B:
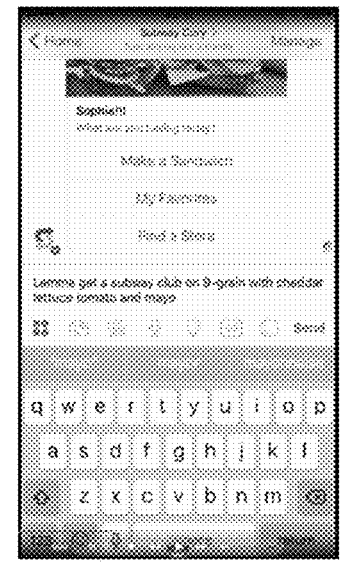
Figure 13C:
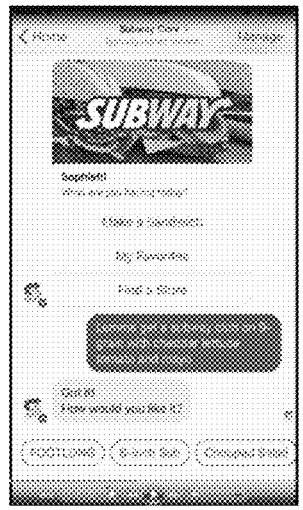
Figure 13D:
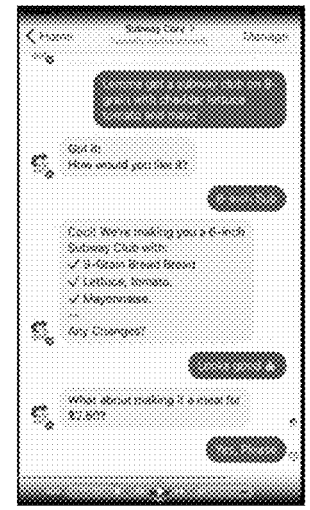
Figure 13E:
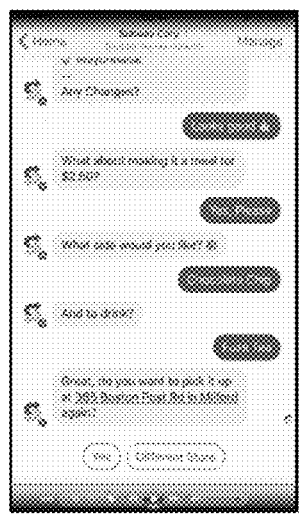
Figure 13F:
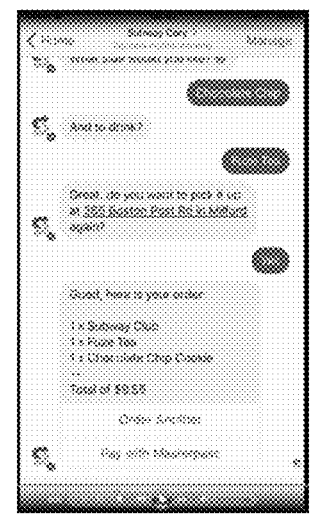
Figure 14A:
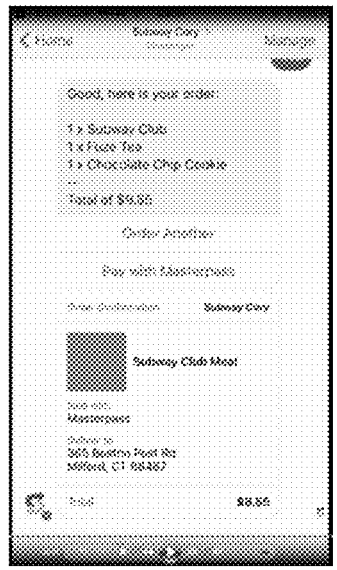
FIGS. 14A to 14C are screenshots of an exemplary user interface for establishing post order defaults for a subsequent order for an embodiment of the disclosure.
Figure 14B:
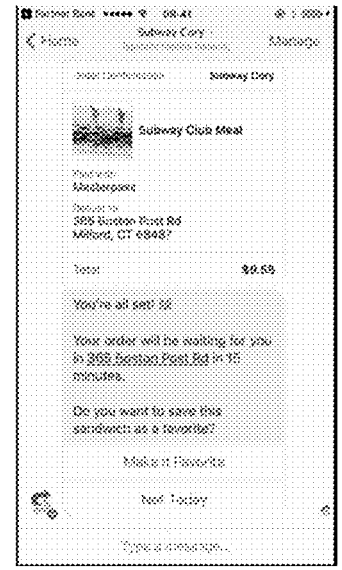
Figure 14C:
Figure 15A:
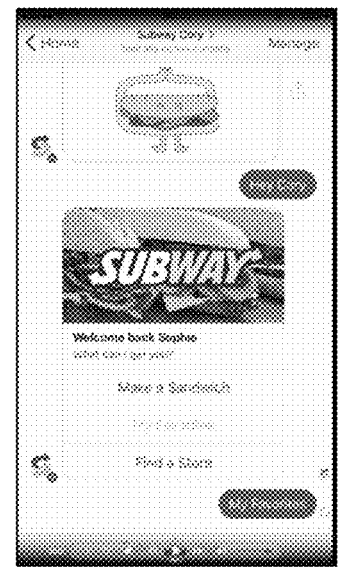
FIGS. 15A to 15C are screenshots of an exemplary user interface for establishing an order from a pre-identified favorite for an embodiment of the disclosure.
Figure 15B:
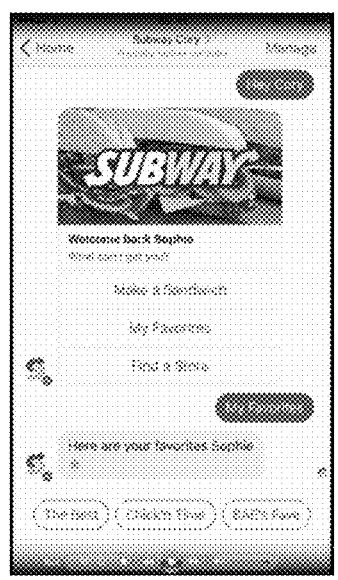
Figure 15C:
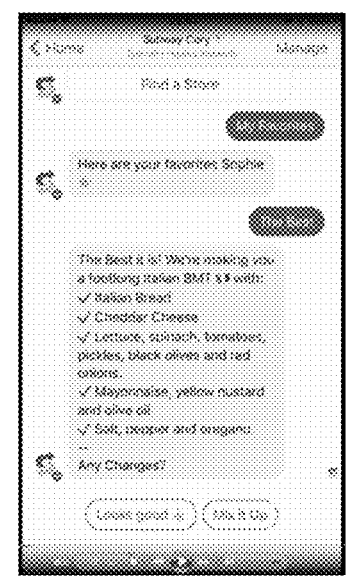

A repeat order flow is shown in FIG. 6. As is typical for messaging applications, such as Facebook® Messenger, when a new session is started by the user 1, this new session is displayed seamlessly below the end of the previous session. Here, the chatbot presents a revised opening dialogue 610 that reflects previous user interactions, for example, as shown in FIG. 13A, the user 1 may be invited as one option to select from previously identified favorites. In this case, the dialogue moves directly on to sandwich construction 620 without a "find a store" step, as the user 1 has made previous orders and their previously used store will act as a default (though an option to use another store 630 will be made subsequently). In the case shown in FIGS. 13B to 13D, the user 1 ignores menu options and simply makes a natural language order, which is understood by the chatbot. The order is then confirmed by the chatbot and an option offered to extend it to a meal, before confirming (or otherwise) that the order is to be fulfilled at the default store (FIG. 13E). The order is then confirmed to the client and if no further order is required 640 payment is invoked 650 as before, with payment confirmation and an option to make an order a favorite being provided as before (FIGS. 14A to 14C). As shown in FIGS. 15A to 15C, an even shorter form of this dialogue results if a user favorite is selected for order.

Figure 11A:
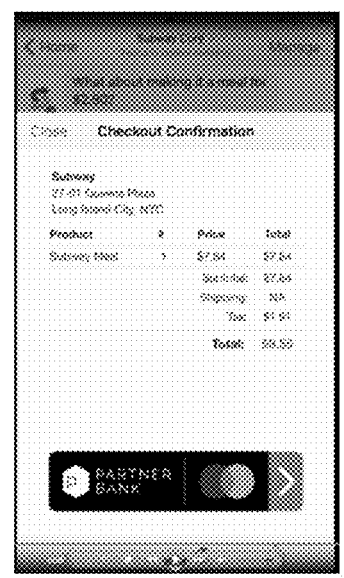
FIGS. 11A to 11C are screenshots of an exemplary user interface for a payment process for embodiments of the disclosure.
Figure 16:
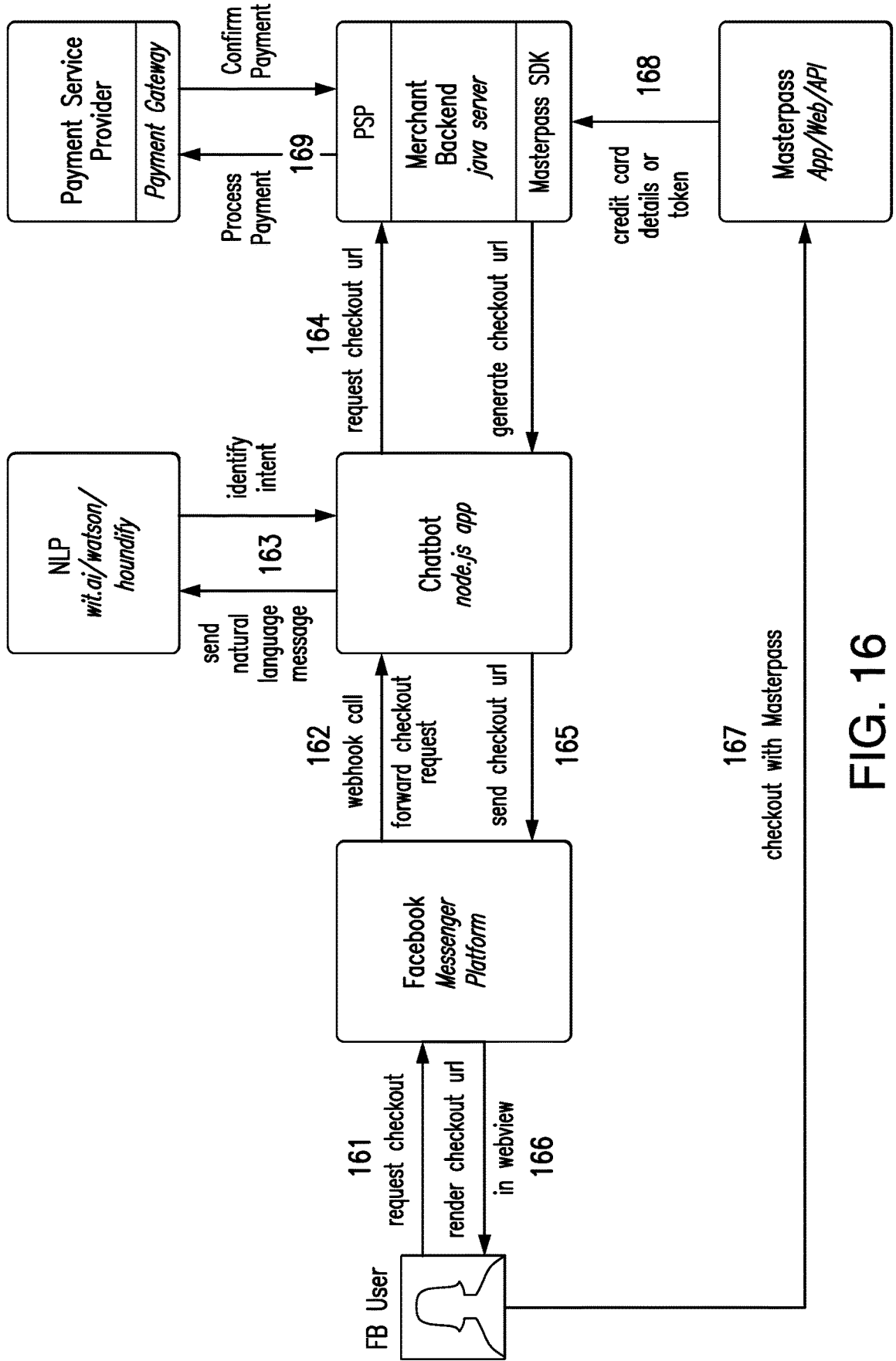
FIG. 16 is a representation of a flow in the payment process from payment request through to transaction for embodiments of the disclosure.

FIG. 7 shows a flow diagram of a payment flow, focused on the user device 2, with alternative options depending on whether or not the user device wallet has been paired with the merchant server 3 (or more specifically, the chatbot interface to the server). FIG. 16 shows flows between relevant system elements and is not limited to the user device 2. When the user 1 has selected payment, then an initial payment view is presented 710 as shown in FIG. 11A. This is a webview presented within Facebook® Messenger, wherein the user 1 has not left the Facebook® Messenger application. This view provides order details for the transaction, including merchant details, and provides a dynamic button for the user 1 to press to confirm that the transaction should proceed. This button can even be provided with issuer bank branding, as the merchant server 3 has the access token, the issuer bank is known. The user 1 confirms that payment is to proceed 720 by tapping the dynamic button. Requiring this user step means that control can remain with the Facebook® Messenger application, rather than control passing to the user device operating system (as would typically be the case for "automatic" processes), which could be problematic.

As can be seen from FIG. 16, there may be numerous steps between the user's expression of a desire to move to payment and the presentation of the dynamic button. The Facebook® Messenger user may express 161 a desire to move to payment which is received by the Facebook® Messenger platform and forwarded 162 to the chatbot. The chatbot may need to use 163 the natural language processor to determine that payment is required, and if so, then a checkout URL is requested 164 from the order processing system (or the chatbot interface to the order processing system). This is generated and returned to the chatbot and sent 165 to the Facebook® Messenger platform for rendering 166 in a reader checkout webview.

Figure 11B:
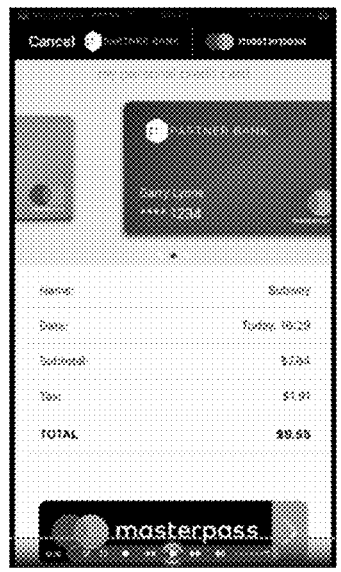
Figure 11C:
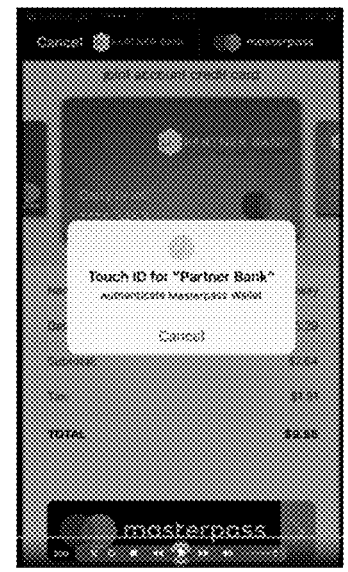
Figure 12A:
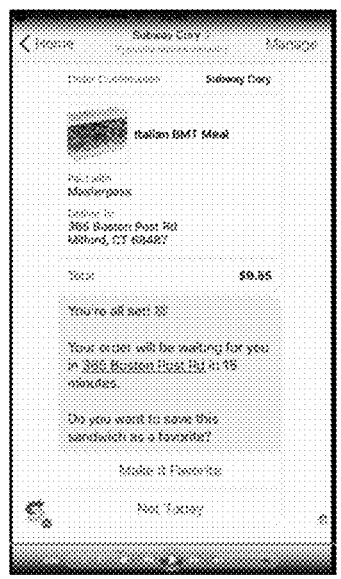
FIGS. 12A to 12D are screenshots of an exemplary user interface for establishing post order defaults for an embodiment of the disclosure.
Figure 12B:
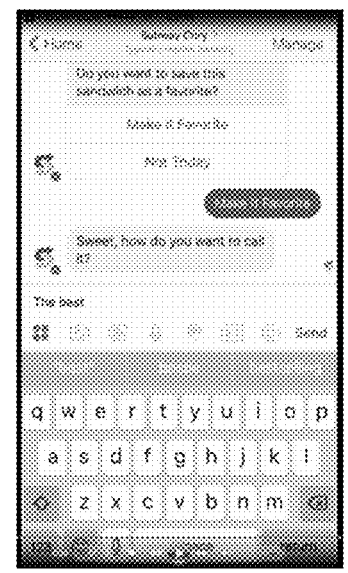
Figure 12C:
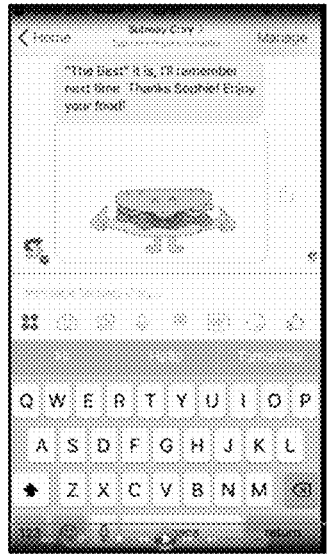
Figure 12D:

Different options will be followed at this point, depending on whether or not pairing has occurred, the consequence of this being that the merchant server 3 will either have a long term access token or a short term access token. If there is a long term access token in place, the wallet can be invoked directly and express checkout can take place 730. In one arrangement, as shown in FIG. 11B, this can take place entirely within Facebook® Messenger, with selection from cards associated with the user's MasterPass® wallet being made using a carousel feature that is provided as an option within webview. Authentication by the user authentication 740 (or any appropriate cardholder verification) may then be required before a checkout token is provided 750 to the merchant chatbot through the interaction 167 of the user device with the MasterPass® system and the provision of a token or card details (if the systems involved require these rather than a token) to the merchant server 3 as a result.

Where there is no pairing and hence no express checkout, additional steps are required. One option is for user authentication 740 to take place before to allow access to the MasterPass® wallet—this can take place in a MasterPass® lightbox. When MasterPass® has been entered, cards may be selected from a carousel 735 essentially as in the case where there has been pairing. An alternative to this is that rather than opening a MasterPass® lightbox within Facebook® Messenger, a native MasterPass® banking application may simply be opened, with cards again being selected from a carousel once an authentication step has been taken. In all of these cases, the result of the user confirmation and selection is a checkout token received 168 by the merchant server 3 and providing sufficient information to allow the transaction system to process the transaction between the user device 2 and the merchant server 3.

Once the merchant server 3 receives the checkout token, this can be used to establish 760, 169 the transaction with the merchant server's gateway to the MasterPass® system. Existing MasterPass® solutions also use such a checkout token, which does not itself provide user credentials (preserving security) but allows them to be accessed through a secure channel into a transaction system gateway. At this point, all the information required for the transaction system to process the transaction is available, and the merchant passes the transaction on to its gateway for processing, at which point the transaction is processed as any conventional MasterPass® transaction.

The skilled person will appreciate that the embodiments described here are exemplary, and that modifications may be made and alternative embodiments provided that fall within the scope of the disclosure. While the embodiment described in detail here relates specifically to food ordering, Facebook® Messenger and MasterPass®, any or all of these may be varied in different embodiments. Embodiments may relate to any ordering process, retail or otherwise, requiring a transaction. Implementations may relate to messaging systems other than Facebook® Messenger, or to social media systems other than Facebook®, or within different application types altogether. Implementations may also relate to digital wallet systems other than MasterPass®, or to systems in which payment at the device is handled through an alternative to a digital wallet.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for using a social media messaging session at a user device of a user to interact with a merchant server, the method comprising:

establishing, by the user device of the user, the social media messaging session between the user device and the merchant server;

opening webview within the social media messaging session on the user device and authenticating the user via a connect webview service within the webview using an authentication mechanism available on a wallet application on the user device;

based on the authenticating of the user, pairing the wallet application with the merchant server via an acceptance by the user of an option for the pairing, displayed on the webview, and recording pairing information in a social media session token, the pairing allowing an express checkout mechanism;

based on the allowing of the express checkout mechanism, provisioning, by the user device, the social media session token for the merchant server, the social media session token not containing information for establishing a transaction for an order being placed on the merchant server, wherein the merchant server uses the social media session token to obtain an access token from a payment service provider to establish the transaction for the order;

generating, by the user device, order information relating to the order for the merchant server in the social media messaging session, wherein the merchant server creates the order from the order information;

displaying order details associated with the order, received from the merchant server, on the webview within the social media messaging session, the webview including a button to be activated to proceed with the transaction for the order; and based on an activation of the button, selecting, using the wallet application, a virtual transaction card from a plurality of transaction cards associated with the wallet application and an account associated with the virtual transaction card, and providing a checkout token containing payment information, including the account, to the merchant server, wherein the merchant server initiates the transaction with the payment service provider using the checkout token and the access token.

2. The method of claim 1, wherein the checkout token does not provide user credentials, and allows the user credentials to be accessed through a secure channel.

3. The method of claim 1, further comprising:
providing authorization for use of the access token in multiple transactions, and wherein the access token allows bypassing of an authorization step at the user device.

4. The method of claim 1, wherein initiating the transaction with the payment service provider comprises using a secure channel to access the payment service provider via a transaction system gateway.

5. The method of claim 1, wherein the social media messaging session is a social media session, and wherein the webview is accessed in the social media session to allow user payment confirmation.

6. The method of claim 1, wherein the social media messaging session includes a payment link as a Uniform Resource Locator (URL) within the webview.

7. A computing device adapted to act as a user device of a user, the computing device comprising:
a processor; and
a memory operationally coupled to the processor, wherein the processor is configured to:
establish a social media messaging session between the user device and a merchant server;
open a webview within the social media messaging session on the user device and authenticate the user via a connect webview service within the webview using an authentication mechanism available on a wallet application on the user device;
based on the authenticating of the user, pair the wallet application with the merchant server via an acceptance by the user of an option for the pairing, displayed on the webview, and record pairing information in a social media session token, the pairing allowing an express checkout mechanism;
based on the allowing of the express checkout mechanism, provision the social media session token for the merchant server, the social media session token not containing information for establishing a transaction for an order being placed on the merchant server, wherein the social media session token is used by the merchant server to obtain an access token from a service provider to establish the transaction with for the order;
generate order information relating to the order for the merchant server in the social media messaging session, wherein the merchant server creates the order from the order information;
display order details associated with the order, received from the merchant server, on the webview, within the social media messaging session, the webview including a button to be activated to proceed with the transaction for the order, and
based on an activation of the button, select, using by the wallet application, a virtual transaction card from a plurality of transaction cards associated with the wallet application and an account associated with the virtual transaction card, and provide a checkout token containing payment information, including the account, to the merchant server, wherein the merchant server initiates the transaction with the payment service provider using the checkout token and the access token.

8. The computing device of claim 7, wherein the processor is further configured to:
display within the webview a selection for confirmation by the user; and
receive from the user an activation of the selection to confirm proceeding with the transaction.

9. The computing device of claim 7, wherein the checkout token does not provide user credentials, and allows the user credentials to be accessed through a secure channel.

10. A non-transitory computer readable medium having computer executable instructions that, when executed by a processor, cause the processor to performs operations comprising:
establishing, by a user device of the user, a social media messaging session between the user device and a merchant server;
opening a webview within the social media messaging session on the user device and authenticating the user via a connect webview service within the webview using an authentication mechanism available on a wallet application on the user device;
based on the authenticating of the user, pairing the wallet application with the merchant server via an acceptance by the user of an option for the pairing, displayed on the webview, and recording pairing information in a social media session token, the pairing allowing an express checkout mechanism;
based on the allowing of the express checkout mechanism, provisioning, by the user device, the social media session token for the merchant server, the social media session token not containing information for establishing a transaction for an order being placed on the merchant server, wherein the merchant server uses the social media session token to obtain an access token from a payment service provider to establish the transaction for the order;
generating, by the user device, order information relating to the order for the merchant server in the social media messaging session, wherein the merchant server creates the order from the order information;
displaying order details associated with the order, received from the merchant server, on the webview within the social media messaging session, the webview including a button to be activated to proceed with the transaction for the order; and
based on an activation of the button, selecting, using the wallet application, a virtual transaction card from a plurality of transaction cards associated with the wallet application and an account associated with the virtual transaction card, and providing a checkout token containing payment information, including the account, to the merchant server, wherein the merchant server initiates the transaction with the payment service provider using the checkout token and the access token.

11. The non-transitory computer readable medium of claim 10, wherein the processor further performs operations comprising:
displaying within the webview a selection for confirmation by the user; and
receiving from the user an activation of the selection to confirm proceeding with the transaction.

12. The non-transitory computer readable medium of claim 10, wherein the social media messaging session includes a payment link as a Uniform Resource Locator (URL) within the webview.

13. The non-transitory computer readable medium of claim 10, wherein the access token is obtained during the social media messaging session, the social media messaging session including at least one natural language question.

14. The non-transitory computer readable medium of claim 10 wherein, initiating the transaction with the payment service provider comprises using a secure channel to access the payment service provider via a transaction system gateway.

15. The non-transitory computer readable medium of claim 10, wherein the checkout token does not provide user credentials, and allows the user credentials to be accessed through a secure channel.

16. The non-transitory computer readable medium of claim 10, wherein the processor further performs operations comprising:
   providing authorization for use of the access token in multiple transactions, and wherein the access token allows bypassing of an authorization step at the user device.

17. The non-transitory computer readable medium of claim 10, wherein the social media messaging session is a social media session.

18. The non-transitory computer readable medium of claim 10, wherein the webview is accessed in the social media messaging session to allow user payment confirmation, and wherein a payment link is provided in the social media messaging session as a Uniform Resource Locator (URL) within the webview.

19. The non-transitory computer readable medium of claim 10, wherein the social media messaging session comprises a chatbot, and further comprising:
   utilizing the chatbot at the merchant server, the chatbot enabling a natural language interaction with the user.

20. The method of claim 1, the method further comprising:
   obtaining an authentication of the user from an issuer bank before providing the checkout token.

* * * * *